(12) United States Patent
Kawamura et al.

(10) Patent No.: US 9,683,074 B2
(45) Date of Patent: Jun. 20, 2017

(54) COPOLYMER RESIN AND COATING COMPOSITION

(71) Applicant: KANSAI PAINT CO., LTD., Hyogo (JP)

(72) Inventors: Chikara Kawamura, Kanagawa (JP); Akinori Nagai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/118,570

(22) PCT Filed: Dec. 26, 2014

(86) PCT No.: PCT/JP2014/084509
§ 371 (c)(1),
(2) Date: Aug. 12, 2016

(87) PCT Pub. No.: WO2015/125400
PCT Pub. Date: Aug. 27, 2015

(65) Prior Publication Data
US 2017/0058080 A1    Mar. 2, 2017

(30) Foreign Application Priority Data

Feb. 19, 2014  (JP) .................................. 2014-029126
Jul. 18, 2014  (JP) .................................. 2014-148232

(51) Int. Cl.
| | | |
|---|---|---|
| *C08G 63/68* | (2006.01) | |
| *C08G 59/18* | (2006.01) | |
| *C08G 63/66* | (2006.01) | |
| *C09D 167/00* | (2006.01) | |
| *C09D 201/06* | (2006.01) | |
| *C09D 167/02* | (2006.01) | |
| *C08G 63/682* | (2006.01) | |
| *C09D 133/06* | (2006.01) | |

(52) U.S. Cl.
CPC ......... *C08G 63/6826* (2013.01); *C08G 59/18* (2013.01); *C08G 63/66* (2013.01); *C08G 63/682* (2013.01); *C09D 133/066* (2013.01); *C09D 167/00* (2013.01); *C09D 167/02* (2013.01); *C09D 201/06* (2013.01)

(58) Field of Classification Search
CPC .. C08G 63/6826; C08G 63/66; C08G 63/682; C08G 59/18; C09D 167/00; C09D 167/02; C09D 201/06; C09D 133/066
USPC ........................................................ 524/513
See application file for complete search history.

(56) References Cited

U.S. PATENT DOCUMENTS

| | | | | |
|---|---|---|---|---|
| 5,476,721 A | * | 12/1995 | Simeone | .............. C08G 63/672 428/480 |
| 5,589,552 A | * | 12/1996 | Simeone | .............. C08G 63/672 525/437 |
| 9,346,961 B2 | * | 5/2016 | Shiraiwa | ................ C09D 5/006 |
| 2006/0222501 A1 | | 10/2006 | Nogami et al. | |

FOREIGN PATENT DOCUMENTS

| | | |
|---|---|---|
| CN | 1324373 | 11/2001 |
| CN | 1840860 | 10/2006 |
| CN | 101883741 | 11/2010 |
| CN | 102887993 | 1/2013 |
| CN | 103360585 | 10/2013 |
| JP | 2-232270 | 9/1990 |
| JP | 7-25997 | 1/1995 |
| JP | 8-193120 | 7/1996 |
| JP | 2000-263714 | 9/2000 |
| JP | 2002-167426 | 6/2002 |
| JP | 2005-105148 | 4/2005 |
| WO | 00/23495 | 4/2000 |
| WO | 00/53682 | 9/2000 |
| WO | 2009/070024 | 6/2009 |

OTHER PUBLICATIONS

International Search Report issued Feb. 24, 2015 in International (PCT) Application No. PCT/JP2014/084509.
Office Action issued Mar. 28, 2017 in corresponding Chinese Application No. 201480077042.3, with English Translation.

\* cited by examiner

*Primary Examiner* — Michael M Bernshteyn
(74) *Attorney, Agent, or Firm* — Wenderoth, Lind & Ponack, L.L.P.

(57) ABSTRACT

An object of the present invention is to provide a coating composition that has excellent storage stability, achieves water and oil repellency over a long period of time, and has excellent chemical resistance and processability. To achieve this object, the present invention provides a copolymer resin (A) comprising, as constituent components, a polybasic acid component (a1); a compound (a2) containing at least one member selected from a secondary-hydroxyl-group-containing polyhydric alcohol component (a21) and a compound (a22), which generates one or more secondary hydroxyl groups by reaction with one or more carboxyl groups; and a specific fluorine-containing diol (f), the component (f) being used in a proportion of 0.1 to 30 mass %, based on the total mass of the constituent components.

10 Claims, No Drawings

COPOLYMER RESIN AND COATING COMPOSITION

TECHNICAL FIELD

CROSS REFERENCE OF RELATED APPLICATIONS

This application claims priority to JP2014-29126, filed Feb. 19, 2014, and JP2014-148232, filed Jul. 18, 2014, the disclosures of which are incorporated herein by reference in their entireties.

The present invention relates to a copolymer resin that has excellent transparency and storage stability. The present invention further relates to a coating composition that has excellent storage stability and is capable of forming a coating film with excellent water and oil repellency, chemical resistance, and processability.

BACKGROUND ART

Examples of coating compositions for indoor and outdoor use include polyurethane-resin-based coating compositions, fluororesin-based coating compositions, silicon-resin-based coating compositions, acrylic-resin-based coating compositions, polyester-based coating compositions, and the like. Articles for, in particular, outdoor use coated with these compositions suffer from deterioration in their surfaces due to the influences of, for example, rain (acid rain), oil-containing soot, sand dust blown by strong wind, and solar rays. In view of such circumstances, the coating films of articles for indoor and outdoor use (e.g., buildings, displays, guard fences, instruments, and machines) have been required to have excellent coating film performance in water and oil repellency, chemical resistance, and processability.

Patent Literature (PTL) 1 discloses a fluorine-containing polyester resin obtained by polymerization of a polyhydric alcohol, a polybasic acid, and a fluorine-containing monomer, such as hexafluoro-1,5-pentanediol, octafluoro-1,6-hexanediol, or 1,3-bis(2-hydroxyhexafluoro-2-propyl)benzene.

Patent Literature (PTL) 2 discloses a fluorine polyester resin obtained by reacting a specific hydroxy-containing perfluoropolyether with an acid anhydride and a polyol. However, even with the use of the resin disclosed in PTL 1 or PTL 2, sufficient water and oil repellency could not be achieved over a long period of time. Moreover, a coating film with excellent chemical resistance and processability could not be obtained.

CITATION LIST

Patent Literature

PTL 1: JPH02-232270A
PTL 2: JPH07-25997A

SUMMARY OF INVENTION

Technical Problem

An object of the present invention is to provide a copolymer resin that has excellent transparency and storage stability. Another object of the present invention is to provide a coating composition that has excellent storage stability and is capable of forming a coating film that has excellent water and oil repellency, chemical resistance, and processability.

Solution to Problem

As a result of extensive research, the present inventors found that the above objects can be achieved with the use of a copolymer resin (A) that is obtained by copolymerization of a mixture comprising, as constituent components, a polybasic acid component (a1), at least one compound (a2) selected from a secondary-hydroxyl-group-containing polyhydric alcohol component (a21) and a compound (a22), which generates one or more secondary hydroxyl groups by reaction with one or more carboxyl groups, and a specific fluorine-containing diol (f), the component (f) being used in a proportion of 0.1 to 30 mass %, based on the total mass of the constituent components.

More specifically, the present invention encompasses the following embodiments:

Item 1. A copolymer resin (A) obtained by polymerization of a mixture comprising, as constituent components,
a polybasic acid component (a1);
a compound (a2) containing at least one member selected from a secondary-hydroxyl-group-containing polyhydric alcohol component (a21) and a compound (a22), which generates one or more secondary hydroxyl groups by reaction with one or more carboxyl groups; and
a fluorine-containing diol (f) having hydroxyl groups at both ends and being represented by Formula (1) below,
the component (f) being used in a proportion of 0.1 to 30 mass %, based on the total mass of the constituent components:

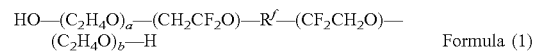

$$HO—(C_2H_4O)_a—(CH_2CF_2O)—R^f—(CF_2CH_2O)—(C_2H_4O)_b—H \quad \text{Formula (1)}$$

wherein a is an integer 0 to 20, b is an integer of 0 to 20, and $R^f$ represents Formula (2) below:

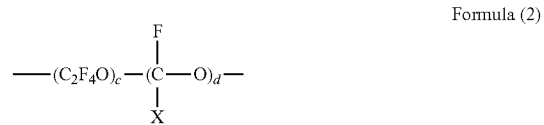

$$—(C_2F_4O)_c—\underset{\underset{X}{|}}{\overset{\overset{F}{|}}{C}}—O)_d— \quad \text{Formula (2)}$$

wherein c is an integer of 1 to 50, d is an integer of 0 to 50, and X represents a fluorine atom or $CF_3$.

Item 2. The copolymer resin (A) according to item 1, comprising phthalic anhydride and/or hexahydrophthalic anhydride, as the polybasic acid component (a1).

Item 3. The copolymer resin (A) according to item 1 or 2, comprising at least one member selected from 1,2-propanediol and 2,2,4-trimethyl-1,3-pentanediol, as the secondary-hydroxyl-group-containing polyhydric alcohol component (a21).

Item 4. The copolymer resin (A) according to any one of Items 1 to 3, further comprising a primary-hydroxy-containing polyhydric alcohol component (a23), as the compound (a2).

Item 5. The copolymer resin (A) according to Item 4, wherein the primary-hydroxy-containing polyhydric alcohol component (a23) is at least one member selected from trimethylolethane, trimethylolpropane, and pentaerythritol.

Item 6. The copolymer resin (A) according to Item 4 or 5, comprising, as the constituent components, the polybasic acid component (a1), the compound (a22), which generates one or more secondary hydroxyl groups by reaction with one or more carboxyl groups, the primary-hydroxy-containing polyhydric alcohol component (a23), and the fluorine-containing diol (f).

Item 7. A coating composition comprising the copolymer resin (A) of any one of item 1 to 6.

Item 8. The coating composition according to item 7, further comprising a hydroxy-containing resin (B) and a crosslinking agent (C).

Item 9. The coating composition according to claim 7 or 8, comprising the copolymer resin (A) in an amount of 0.1 to 30 parts by mass, on a solids basis, per 100 parts by mass of the total solids content of the hydroxy-containing resin (B) and the crosslinking agent (C).

Item 10. A coated article obtained by applying the coating composition of any one of item 7 to 9.

Advantageous Effects of Invention

The copolymer resin of the present invention has excellent transparency and storage stability. A coating composition comprising the copolymer resin of the present invention has excellent storage stability and is thus advantageous for long-term storage and transportation. An article coated with the coating composition of the present invention maintains its water and oil repellency over a long period of time, and has excellent chemical resistance and processability.

DESCRIPTION OF EMBODIMENTS

The present invention relates to a copolymer resin (A) comprising, as constituent components, a polybasic acid component (a1), a compound (a2) containing at least one member selected from a secondary-hydroxyl-group-containing polyhydric alcohol component (a21) and a compound (a22), which generates one or more secondary hydroxyl groups by reaction with one or more carboxyl groups, and a specific fluorine-containing diol (f) having hydroxyl groups at both ends, the component (f) being used in a proportion of 0.1 to 30 mass %, based on the total mass of the constituent components. Below, the "fluorine-containing diol (f) having hydroxyl groups at both ends" may be sometimes abbreviated as a "fluorine-containing diol (f)."

The present invention also relates to a coating composition comprising a copolymer resin (A), a hydroxy-containing resin (B), and a crosslinking agent (C). The following describes the details.

Copolymer Resin (A)

The copolymer resin of the present invention (A) comprises, as constituent components, a polybasic acid component (a1), and at least one compound (a2) selected from a secondary-hydroxyl-group-containing polyhydric alcohol component (a21) and a compound (a22), which generates one or more secondary hydroxyl groups by reaction with one or more carboxyl groups, and a fluorine-containing diol (f). The component (f) is used in a proportion of 0.1 to 30 mass %, and preferably 8 to 25 mass %, based on the total mass of the constituent components.

Polybasic Acid Component (a1)

The polybasic acid component (a1) used in the production of the copolymer resin of the present invention (A) is a compound containing two or more carboxyl groups, or an anhydride thereof, that can react with the compound (a2) mentioned below and form an ester bond (—(C=O)—O—). The number of carboxyl groups, when contained, is not particularly limited, and is preferably two or three. When it is an anhydride, the number of carboxylic anhydride (equivalent to two carboxyl groups) is not particularly limited, and is preferably one. Examples of the polybasic acid component (a1) include alicyclic polybasic acids, aliphatic polybasic acids, aromatic polybasic acids, and the like, as well as anhydrides and lower alkyl esters of these polybasic acid components.

Examples of the alicyclic polybasic acids include alicyclic polycarboxylic acids, such as 1,3-cyclohexanedicarboxylic acid, 1,4-cyclohexanedicarboxylic acid, 1,2,4-cyclohexanetricarboxylic acid, and 1,3,5-cyclohexanetricarboxylic acid, and the like. These alicyclic polybasic acids may be used alone or in a combination of two or more.

Examples of anhydrides of the alicyclic polybasic acids include hexahydrophthalic anhydride, 3-methyl-hexahydrophthalic anhydride, 4-methyl-hexahydrophthalic anhydride, tetrahydrophthalic anhydride, 3-methyl-tetrahydrophthalic anhydride, anhydrides of 1,2,4-cyclohexanetricarboxylic acid, and the like.

Examples of the aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; and the like. These aliphatic polybasic acids may be used alone or in a combination of two or more. Examples of anhydrides of the aliphatic polybasic acids include succinic anhydride and the like.

Examples of the aromatic polybasic acid include phthalic acid, isophthalic acid, terephthalic acid, naphthalenedicarboxylic acid, 4,4'-biphenyldicarboxylic acid, trimellitic acid, and like aromatic polyvalent carboxylic acids; and the like. These aromatic polybasic acids may be used alone or in a combination of two or more. Examples of anhydrides of the aromatic polybasic acids include phthalic anhydride, trimellitic anhydride, and pyromellitic anhydride. Of the anhydrides of the polybasic acid component (a1), in particular, phthalic anhydride and hexahydrophthalic anhydride are preferable to improve the storage stability and water and oil repellency.

Compound (a2)

The compound (a2) used in the production of the copolymer resin (A) of the present invention is at least one member selected from a secondary-hydroxyl-group-containing polyhydric alcohol component (a21) and a compound (a22), which generates one or more secondary hydroxyl groups by reaction with one or more carboxyl groups. However, the fluorine-containing diol (f) mentioned below is excluded from the component. The compound (a2) can react with the polybasic acid component (a1) and form an ester bond (—(C=O)—O—).

The compound (a2) may optionally comprise a polyhydric alcohol component (a23) other than the polyhydric alcohol component (a21) and the compound (a22), if necessary. As the compound (a2), only alcohol components is used, in addition to the secondary-hydroxyl-group-containing polyhydric alcohol component (a21) and the compound (a22), which generates one or more secondary hydroxyl groups by reaction with one or more carboxyl groups.

Secondary-hydroxyl-group-containing Polyhydric Alcohol Component (a21)

The secondary-hydroxyl-group-containing polyhydric alcohol component (a21) is an alcohol compound that contains two or more hydroxyl groups, one or more of which hydroxyl groups are secondary hydroxyl groups. The number of hydroxyl groups is not particularly limited, and is preferably 2 to 6. It is sufficient if at least one hydroxyl group among the two or more hydroxyl groups is a secondary hydroxyl group.

Examples of the secondary-hydroxyl-group-containing polyhydric alcohol component (a21) include 1,2-propanediol, 2-methyl-1,3-propanediol, 1,3-butanediol, 1,2-butanediol, 2,3-butanediol, dipropylene glycol, 3-methyl-1,2-butanediol, 1,2-pentanediol, 1,3-pentanediol, 1,4-pentanediol, 2,3-pentanediol, 2,4-pentanediol, 2,2,4-trimethyl-1,3-pentanediol, 1,5-hexanediol, 1,4-hexanediol, 2,5-hexanediol, glycerin, diglycerin, triglycerin, 1,2,6-hexanetriol, sorbitol, and mannite. Of these, in particular, the use of 1,2-propanediol and 2,2,4-trimethyl-1,3-pentanediol is preferable to improve the processability.

Compound (a22), which Generates One or More Secondary Hydroxyl Groups by Reaction with One or More Carboxyl Groups The compound (a22), which generates one or more secondary hydroxyl groups by reaction with one or more carboxyl groups, is a compound containing at least one group that generates a secondary hydroxyl group by reaction with a carboxyl group. The number of the groups that generate a secondary hydroxyl group by reaction with a carboxyl group is not particularly limited. For example, the group that generates a secondary hydroxyl group by reaction with a carboxyl group may be 1 to 5, 1 to 3, or 1 or 2. Examples of the group that generates a secondary hydroxyl group by reaction with a carboxyl group include epoxy.

For example, an epoxy compound having an epoxy equivalent of 100 to 500, and more preferably 110 to 300 is exemplified.

Examples of commercially available epoxy compounds include Denacol EX-141, Denacol EX-145, Denacol EX-146, Denacol EX-171, Denacol EX-201, Denacol EX-211, Denacol EX-212, Denacol EX-214, and Denacol EX-321 (all trade names of products by Nagase ChemteX Corporation), ethylene oxide, propylene oxide, butylene oxide, and like $C_{2-8}$ alkylene oxides, 1,2-epoxycyclohexane, glycidol, methyl glycidate, Cardula E10 (trade name of product by HEXION Specialty Chemicals), and the like.

Incorporation of the compound (a22) into the copolymer resin (A) makes it possible to improve the storage stability of the coating composition, and to improve the chemical resistance and processability of the obtained coating film.

Polyhydric Alcohol Component

As the compound (a2), a polyhydric alcohol component other than the polyhydric alcohol component (a21) and the compound (a22) may further be used. However, the fluorine-containing diol (f) mentioned below is excluded.

Examples of the polyhydric alcohol component other than the polyhydric alcohol component (a21) and the compound (a22) include polyhydric alcohols free from secondary hydroxyl groups, such as diols free from secondary hydroxyl groups, and trihydric or higher alcohols free from secondary hydroxyl groups. Of these, preferable examples include a primary-hydroxy-containing polyhydric alcohol component (a23) other than the polyhydric alcohol component (a21) and the compound (a22).

Specific examples include dihydric alcohols, such as 1,4-cyclohexanedimethanol, tricyclodecanedimethanol, hydrogenated bisphenol A, and hydrogenated bisphenol F; and alicyclic diols, such as polylactone diols obtained by adding lactone compounds, such as ε-caprolactone, to these dihydric alcohols. These may be used alone or in a combination of two or more.

Examples also include aliphatic diols, such as ethylene glycol, 1,3-propylene glycol, diethylene glycol, trimethylene glycol, tetraethylene glycol, triethylene glycol, 1,4-butanediol, 2-butyl-2-ethyl-1,3-propanediol, 1,5-pentanediol, 2,3-dimethyltrimethylene glycol, tetramethylene glycol, 3-methyl-1,5-pentanediol, 1,6-hexanediol, 1,9-nonanediol, 1,10-decanediol, 1,12-dodecanediol, neopentyl glycol, polyethylene glycol, polypropylene glycol, and polybutylene glycol. These may be used alone or in a combination of two or more.

Examples further include ester diol compounds, such as bis(hydroxyethyl)terephthalate; and aromatic diols, such as alkylene oxide adducts of bisphenol A. These may be used alone or in a combination of two or more.

Examples furthermore include alcohols, such as trimethylolethane, trimethylolpropane, pentaerythritol, and dipentaerythritol; polylactone polyol compounds obtained by adding lactone compounds, such as ε-caprolactone, to these alcohols; tris(hydroxyalkyl)isocyanurates, such as tris(2-hydroxyethyl)isocyanurate, tris(2-hydroxypropyl)isocyanurate, and tris(2-hydroxybutyl)isocyanurate; and the like.

As the compound (a2), for example, monohydric alcohols, such as methanol, ethanol, propyl alcohol, butyl alcohol, stearyl alcohol, and 2-phenoxyethanol, may also be optionally used, if necessary.

As the compound (a2), for example, the secondary-hydroxyl-group-containing polyhydric alcohol component (a21) or the compound (a22), which generates one or more secondary hydroxyl groups by reaction with one or more carboxyl groups, may be used singly, or in a combination of (a21) and (a22). When the polyhydric alcohol component (a23) is used in combination as the compound (a2), a combination of (a21) and (a23), a combination of (a22) and (a23), a combination of (a21), (a22), and (a23) may be used.

Fluorine-containing Diol (f)

A fluorine-containing diol (f) is a compound represented by the following Formula (1).

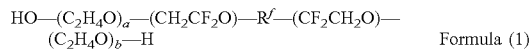

$$HO-(C_2H_4O)_a-(CH_2CF_2O)-R^f-(CF_2CH_2O)-(C_2H_4O)_b-H \qquad \text{Formula (1)}$$

In Formula (1), a is an integer of 0 to 20, and preferably an integer of 1 to 20, b is an integer of 0 to 20, and preferably an integer of 1 to 20, and $R^f$ represents Formula (2) below.

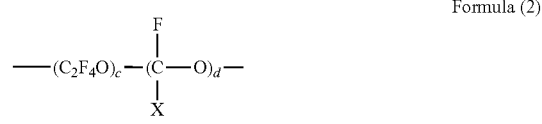

$$-(C_2F_4O)_c-(\underset{X}{\underset{|}{\overset{F}{\overset{|}{C}}}}-O)_d- \qquad \text{Formula (2)}$$

In Formula (2), c is an integer of 1 to 50, d is an integer of 1 to 50, and X represents a fluorine atom or $CF_3$.

More specifically, the fluorine-containing diol (f) is represented by $HO-(C_2H_4O)_a-CH_2CF_2O-(C_2F_4O)C(CF_2O)_d-CF_2CH_2O-(C_2H_4O)_b-H$, $HO-CH_2CF_2O-(C_2F_4O)C-(CF_2O)_d-CF_2CH_2-OH$, or the like.

Examples of commercially available fluorine-containing diol (f) include Fluorolink E10-H (trade name of product by Solvay; a is 1 to 20 in Formula (1)) and Fluorolink D10-H (trade name of product by Solvay; a is 0, and B is 0 in Formula (1)).

Method for Producing Copolymer Resin (A)

The copolymer resin (A) is obtained by mixing the polybasic acid component (a1), the compound (a2), and the fluorine-containing diol (f), and performing copolymerization reaction of this mixture. As the compound (a2), other alcohol components such as the polyhydric alcohol component (a23) and the like may also be optionally used, if necessary.

In the production of the copolymer resin (A), the fluorine-containing diol (f) is used in a proportion of 0.1 to 30 mass %, and preferably 1 to 20 mass %, based on the total mass of the constituent components.

In the production of the copolymer resin (A), the amounts of the polybasic acid component (a1), the compound (a2), the fluorine-containing diol (f), and other alcohol components, based on the total amount of the total monomer components constituting the mixture for obtaining the copolymer resin (A), are preferably within the following ranges to improve the coating film performance:

the polybasic acid component (a1): 30 to 62 mass %, and preferably 42 to 55 mass %;

the compound (a2): 8 to 52 mass %, and preferably 15 to 35 mass %;

the fluorine-containing diol (f): 0.1 to 30 mass %, and preferably 1 to 20 mass %; and other alcohol components: 0 to 29.9 mass %, and preferably 3 to 9 mass % ("0 mass %" indicates that it is not incorporated).

Examples of specific production methods include the following method 1.

Method 1

The polybasic acid component (a1), the compound (a2), and the fluorine-containing diol (f), and optionally other alcohol components, are collectively added, followed by mixing and stirring, and then in a nitrogen stream, a catalyst is added, as required, and an esterification reaction is performed at 150 to 250° C., and preferably 170 to 230° C., for 1 to 10 hours, and preferably 2 to 7 hours. In this manner, the copolymer resin (A) is produced.

After the reaction above, an acid anhydride may be reacted for half-esterification.

The copolymer resin (A) may also be obtained by mixing the polybasic acid component (a1), the compound (a2), and the fluorine-containing diol (f), and optionally other alcohol components, in multiple stages.

Examples of specific production methods also include the following method 2.

Method 2

Step 1: An anhydride of the polybasic acid component (a1) and the fluorine-containing diol (f) are added to be mixed and stirred, and then in a nitrogen stream, a catalyst is added, as required, and an esterification reaction is performed at 50 to 200° C., and preferably 100 to 180° C., for 10 minutes to 5 hours, and preferably 30 minutes to 2 hours.

Step 2: Subsequently, the polybasic acid component (a1) other than the anhydride of the polybasic acid component, and the compound (a2) are mixed, and then in a nitrogen stream, a catalyst is added, as required, and an esterification reaction is performed at 150 to 250° C., and preferably 170 to 230° C., for 1 to 10 hours, and preferably 2 to 7 hours. In this manner, the copolymer resin (A) is obtained.

After the reaction above, an acid anhydride may be reacted for half-esterification.

The use of the polymerization reaction above (method 2) enables the production of a copolymer resin (A) having, in particular, excellent transparency.

As the catalyst above, known catalysts are usable, such as dibutyltin oxide, antimony trioxide, zinc acetate, manganese acetate, cobalt acetate, calcium acetate, lead acetate, tetrabutyl titanate, and tetraisopropyl titanate. The copolymer resin (A) may be modified with fatty acids, oils, polyisocyanate compounds, or the like, during the reaction of the resin or after the esterification reaction.

Examples of the fatty acids include fatty acids such as palm oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; lauric acid, myristic acid, palmitic acid, stearic acid, oleic acid, linoleic acid, linolenic acid, and the like.

Examples of the oils include palm oil, cottonseed oil, hempseed oil, rice bran oil, fish oil, tall oil, soybean oil, linseed oil, tung oil, rapeseed oil, castor oil, dehydrated castor oil, safflower oil, and the like.

Examples of polyisocyanate compounds that can be used in the modification include aliphatic diisocyanate compounds such as lysine diisocyanate, hexamethylene diisocyanate, and trimethyl hexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), and 1,3-(isocyanatomethyl)cyclohexane; aromatic diisocyanate compounds such as tolylene diisocyanate, xylylene diisocyanate, and diphenylmethane diisocyanate; organic polyisocyanates such as trihydric or higher polyisocyanates such as lysine triisocyanate, and adducts of these organic polyisocyanates and polyhydric alcohols, low-molecular weight polyester resins, water, and the like; biuret-type adducts and cyclized polymers (e.g. isocyanurate) of the organic diisocyanates mentioned above; and the like. These may be used alone or in a combination of two or more.

From the viewpoint of composition stability, water and oil repellency, chemical resistance, and processability, it is desirable that the obtained copolymer resin (A) has a weight average molecular weight of 1,000 to 30,000, and preferably 2,000 to 20,000, a hydroxy value of 0 to 300 mg KOH/g, and preferably 1 to 200 mg KOH/g, and an acid value of 0 to 100 mg KOH/g, and preferably 1 to 50 mg KOH/g.

The weight average molecular weight as used here are determined by converting the weight average molecular weight measured using a gel permeation chromatograph (GPC), based on the molecular weight of polystyrene standards.

More specifically, the weight average molecular weight can be determined by converting a value measured using an HLC-8120GPC gel permeation chromatography apparatus (trade name of product by Tosoh Corporation), together with four columns: TSKgel G-4000 HXL, TSKgel G-3000 HXL, TSKgel G-2500 HXL, and TSKgel G-2000 HXL (all trade names of products by Tosoh Corporation) under the following conditions: mobile phase: tetrahydrofuran; measurement temperature: 40° C.; flow rate: 1 mL/min; detector: RI.

Hydroxy-containing Resin (B)

The hydroxy-containing resin (B) contains one or more hydroxyl groups and optionally further contains one or more carboxyl groups. Specific examples of the hydroxy-containing resin (B) include acrylic resins, polyester resins, epoxy resins, polyurethane resins, and the like. Of these, hydroxy-containing polyester resins are preferable to improve the processability.

The hydroxy-containing acrylic resins are copolymer resins obtained by a copolymerization reaction of a hydroxy-containing acrylic monomer and other monomers. A hydroxy-containing monomer is a compound containing one or more hydroxyl groups and one or more polymerizable unsaturated bonds per molecule. Examples of the hydroxy-containing monomer include monoesters of $C_{2-20}$ glycol with (meth)acrylic acid, such as hydroxyethyl (meth)acrylate, hydroxypropyl (meth)acrylate, hydroxybutyl (meth)acrylate, and hydroxyicosyl (meth)acrylate.

Examples of the monomers other than the hydroxy-containing monomer include $C_{1-22}$ alkyl esters of (meth)acrylic acid, $C_{2-18}$ alkoxyalkyl esters of (meth)acrylic acid, epoxy-containing monomers, carboxy-containing monomers, monomers having both isocyanate group(s) and polymerizable unsaturated group(s) in the same molecule, styrene, α-methylstyrene, vinyltoluene, acrylonitrile, vinyl acetate, vinyl chloride, and the like. Examples of the $C_{1-22}$ alkyl esters of (meth)acrylic acid include methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate, cyclohexyl (meth)acrylate, isobornyl (meth)acrylate, and the like. Examples of $C_{2-18}$ alkoxyalkyl esters of (meth)acrylic acid include methoxybutyl (meth)acrylate, methoxyethyl (meth)acrylate, and the like. Examples of epoxy-containing monomers include glycidyl acrylate, glycidyl methacrylate, and the like. Examples of carboxy-containing monomers include acrylic acid, methacrylic acid, maleic acid, itaconic acid, fumaric acid, and mesaconic acid; anhydrides or half-esterified products thereof; and the like. Such monomers other than hydroxy-containing monomers may be used alone or in a combination of two or more.

The hydroxy-containing acrylic resin preferably has a number average molecular weight of about 1,000 to 50,000, and more preferably about 2,000 to 20,000. The hydroxy-containing acrylic resin preferably has a hydroxy value of about 20 to 200 mg KOH/g, and more preferably about 50 to 150 mg KOH/g.

The hydroxy-containing polyester resin is usually obtained by an esterification reaction of a polybasic acid component (b1) and a polyhydric alcohol component (b2). As the polybasic acid component (b1), a polybasic acid similar to those that are used in the production of the copolymer resin (A) may be used. As the polyhydric alcohol component (b2), a polyhydric alcohol similar to those that are used in the production of the copolymer resin (A) may be used.

The method for producing the hydroxy-containing polyester resin is not particularly limited, and may be a common method. For example, the polybasic acid component (b1) and the polyhydric alcohol component (b2), and optionally the compound (a2), which generates one or more secondary hydroxyl groups by reaction with one or more carboxyl groups, are mixed, and then in a nitrogen stream, a catalyst is added, as required, and an esterification reaction is performed at 150 to 250° C., and preferably 170 to 230° C., for 1 to 10 hours, and preferably 2 to 7 hours.

In the esterification reaction, the polybasic acid component (b1) and the polyhydric alcohol component (b2) may be added at once or in divided portions. After the hydroxy-containing polyester resin is synthesized, an acid anhydride may be reacted for half-esterification.

As the catalyst, a similar catalyst as those used in the production of the copolymer resin (A) may be used. The hydroxy-containing polyester resin may be modified with fatty acids, oils, monoepoxy compounds, polyisocyanate compounds, or the like, during the preparation of the resin or after the esterification reaction. A hydroxy-containing polyester resin modified with a fatty acid or an oil is called alkyd resin. As the fatty acid, a fatty acid similar to those used in the production of the copolymer resin (A) may be used. These may be used alone or in a combination of two or more.

The hydroxy-containing polyester resin has a number average molecular weight of preferably 2,000 to 30,000, and particularly preferably 3,000 to 20,000, from the viewpoint of the chemical resistance and processability of the obtained coating film.

The hydroxy-containing polyester resin preferably has a hydroxy value of preferably 5 to 250 mg KOH/g, and particularly preferably 10 to 200 mg KOH/g, from the viewpoint of curability of the obtained coating film. The hydroxy-containing polyester resin has an acid value of preferably 30 mg KOH/g or less, and more preferably 2 to 20 mg KOH/g, from the viewpoints of chemical resistance.

Crosslinking Agent (C)

The crosslinking agent (C) used in the coating composition of the present invention is not particularly limited as long as upon heating it can react with the hydroxyl group of the hydroxy-containing resin (B) and cure the coating composition. Examples include melamine resins, benzoguanamine resins, urea resins, blocked polyisocyanates, and the like.

Examples of melamine resins include etherified melamine resin obtained by etherifying the methylol groups of methylolated melamine resin with a $C_{1-8}$ monohydric alcohol. The etherified melamine resin may be those in which the methylol groups of methylolated melamine resin are fully etherified, or those in which the methylol groups of methylolated melamine resin are partially etherified, with remaining methylol groups and imino groups.

Specific examples of melamine resins include complete alkyl-type methyl/butyl mixed etherified melamine resins, methylol group-type methyl/butyl mixed etherified melamine resins, imino-type methyl/butyl mixed etherified melamine resins, complete-alkyl-type methylated melamine resins, and imino-group-type methylated melamine resins. These melamine resins may be used alone or in a combination of two or more.

Examples of commercially available melamine resins include complete-alkyl-type methyl/butyl mixed etherified melamine resins, such as Cymel 232, Cymel 232S, Cymel 235, Cymel 236, Cymel 238, Cymel 266, Cymel 267, and Cymel 285; methylol-group-type methyl/butyl mixed etherified melamine resins such as Cymel 272; imino-type methyl/butyl mixed etherified melamine resins, such as Cymel 202, Cymel 207, Cymel 212, Cymel 253, and Cymel 254; complete-alkyl-type methylated melamine resins, such as Cymel 300, Cymel 301, Cymel 303, and Cymel 350; imino-group-type methylated melamine resins, such as Cymel 325, Cymel 327, Cymel 703, Cymel 712, Cymel 254, Cymel 253, Cymel 212, and Cymel 1128 (all produced by Nihon Cytec Industries Inc.); U-Van 20SE60 (butyl-etherified melamine resin produced by Mitsui Cytec, Ltd.); and the like.

Examples of benzoguanamine resins include methylolated benzoguanamine resins obtained by reacting benzoguanamine and an aldehyde. Examples of aldehydes include formaldehyde, paraformaldehyde, acetaldehyde, benzaldehyde, and the like. Benzoguanamine resins further include compounds obtained by etherifying such methylolated benzoguanamine resins with one or more alcohols. Examples of alcohols that can be used for the etherification include monohydric alcohols such as methyl alcohol, ethyl alcohol, n-propyl alcohol, isopropyl alcohol, n-butyl alcohol, isobutyl alcohol, 2-ethylbutanol, and 2-ethylhexanol. Among these, benzoguanamine resins obtained by etherifying at least a part of the methylol groups of a methylolated benzoguanamine resin with a monohydric alcohol having 1 to 4 carbon atoms are particularly suitable.

Specific examples of the above benzoguanamine resins include methyl-etherified benzoguanamine resins such as Mycoat 102, Mycoat 105, Mycoat 106, (all produced by Mitsui Cytec Ltd.), Nikalac SB-201, Nikalac SB-203, Nikalac SB-301, Nikalac SB-303 and Nikalac SB-401 (all produced by Sanwa Chemical Co., Ltd.); mixed methyl- and ethyl-etherified benzoguanamine resins such as Cymel 1123 (produced by Mitsui Cytec Ltd.); mixed methyl- and butyl-etherified benzoguanamine resins such as Mycoat 136 (produced by Mitsui Cytec Ltd.), Nikalac SB-255, Nikalac SB-355, Nikalac BX-37 and Nikalac BX-4000 (all produced by Sanwa Chemical Co., Ltd.); and butyl-etherified benzoguanamine resins such as Mycoat 1128 (produced by Mitsui Cytec Ltd.).

Urea resins are obtained by a condensation reaction between urea and formaldehyde, and can be dissolved or dispersed in a solvent or water. Polyisocyanate compounds are compounds that have two or more isocyanate groups per molecule. Examples of polyisocyanate compounds include aromatic diisocyanates such as tolylene diisocyanate, diphenylmethane diisocyanate, xylylene diisocyanate, and naphthalene diisocyanate; aliphatic diisocyanates such as tetramethylene diisocyanate, hexamethylene diisocyanate, dimer acid diisocyanate, and lysine diisocyanate; alicyclic diisocyanates such as methylenebis(cyclohexyl isocyanate), isophorone diisocyanate, methylcyclohexane diisocyanate, cyclohexane diisocyanate, and cyclopentane diisocyanate; biuret-type adducts or isocyanurate ring adducts of these polyisocyanates; and free isocyanate-containing prepolymers obtained by reacting these polyisocyanates with low molecular weight or high molecular weight polyol compounds (such as acrylic polyol, polyester polyol, and polyether polyol) under isocyanate group excess conditions.

It is also possible to use blocked polyisocyanates obtained by blocking free isocyanate groups of these polyisocyanates with blocking agents, such as phenolic compounds, oxime compounds, active methylene compounds, lactam compounds, alcohol compounds, mercaptan compounds, acid amide compounds, imide compounds, amine compounds, imidazole compounds, urea compounds, carbamic acid compounds, and imine compounds.

The coating composition of the present invention comprises the copolymer resin (A) as an essential component. The coating composition of the present invention preferably comprises the copolymer resin (A), the hydroxy-containing resin (B), and the crosslinking agent (C). To obtain a coating film with, for example, excellent chemical resistance and processability, the mixing ratio of the hydroxy-containing resin (B) and the crosslinking agent (C) is as follows: the hydroxy-containing resin (B) is used in an amount of 60 to 95 parts by mass, and preferably 70 to 90 parts by mass, on a solids basis, and the crosslinking agent (C) is used in an amount of 5 to 40 parts by mass, and preferably 10 to 30 parts by mass, on a solids basis, per 100 parts by mass of the total solids content of these components.

To achieve excellent composition stability, water and oil repellency, chemical resistance, and processability, it is desirable that the copolymer resin (A) be contained in an amount of 0.1 to 30 parts by mass, preferably 0.5 to 10 parts by mass, and more preferably 1 to 8 parts by mass, on a solids basis, per 100 parts by mass of the total solids content of the hydroxy-containing resin (B) and the crosslinking agent (C).

In addition to the copolymer resin (A), the hydroxy-containing resin (B), and the crosslinking agent (C), the coating composition of the present invention may optionally contain surfactants, lubricity-imparting agents, pigments such as color pigments and extender pigments, coating additives such as curing catalysts, pigment dispersants, UV absorbers, UV stabilizers, defoaming agents, surface control agents, and other fluorine-based compounds, other matting agents, such as fine silica powders and dehydrating agents, organic solvents, other resins, and known coating materials that have previously been used in coating compositions.

The lubricity-imparting agent may be any lubricant known in the field of coating compositions insofar as the lubricant does not impair coating film appearance and imparts lubricity to the coated surface. Representative examples of such lubricity-imparting agents include polyolefin waxes such as polyethylene wax; modified silicone oils such as polyether-modified silicone oil, higher fatty acid ester-modified silicone oil, and higher alkoxy-modified silicone oil; paraffin waxes such as microcrystalline wax; fatty acid ester waxes such as montan wax, lanolin wax, carnauba wax, beeswax, and spermaceti; and fluorine waxes such as tetrafluoroethylene.

Specific examples of the pigments include color pigments, such as white pigments such as titanium white and zinc flower; blue pigments such as cyanine blue and indanthrene blue; green pigments such as cyanine green and verdigris; organic red pigments such as azo red pigments and quinacridone red pigments; red pigments such as red iron oxide; organic yellow pigments such as benzimidazolone yellow pigments, isoindolinone yellow pigments, isoindoline yellow pigments, and quinophthalone yellow pigments; yellow pigments such as titanium yellow, chrome yellow, and iron oxide yellow; and black pigments such as carbon black, graphite, and burnt pine; extenders such as clay, talc, baryta, and calcium carbonate; rust-prevention pigments such as aluminum tripolyphosphate, zinc molybdate, and vanadium pentoxide; and the like.

For example, a curing catalyst is optionally incorporated as necessary to promote the reaction between the hydroxy-containing resin (B) and the crosslinking agent (C). When the crosslinking agent (C) is an amino resin, a sulfonic acid compound or a sulfonic acid compound neutralized with an amine is preferably used.

Representative examples of the sulfonic acid compound include p-toluenesulfonic acid, dodecylbenzenesulfonic acid, dinonylnaphthalenesulfonic acid, dinonylnaphthalenedisulfonic acid, and the like. The amine in the sulfonic acid compound neutralized with an amine may be any of primary amines, secondary amines, and tertiary amines. Among these, p-toluenesulfonic acid neutralized with an amine, and/or dodecylbenzenesulfonic acid neutralized with an amine are preferable from the viewpoints of coating composition stability, reaction-promoting effect, and physical properties of the obtained coating film.

When the crosslinking agent (C) is a blocked polyisocyanate compound, examples of curing catalysts include organic metal compounds such as tin octylate, dibutyltin di(2-ethylhexanoate), dioctyltin di(2-ethylhexanoate), dioctyltin diacetate, dibutyltin dilaurate, dibutyltin oxide, monobutyltin trioctate, lead 2-ethylhexanoate, and zinc octylate. Such a curing catalyst is present preferably in an amount of 0.1 to 5.0 parts by mass, and more preferably 0.2 to 1.5 parts by mass, per 100 parts by mass of the total solids content of the hydroxy-containing resin (B) and the crosslinking agent (C).

The coating composition of the present invention is obtained by uniformly mixing the copolymer resin (A), the hydroxy-containing resin (B), and the crosslinking agent (C), and optionally with other components mentioned above.

The solvent in the coating composition may be water or an organic solvent.

When the coating composition of the present invention is applied, the solids concentration is preferably adjusted to be within a range of 20 to 60 mass % to achieve a viscosity of 10 to 100 seconds in Ford Cup No. 4 (at 20° C.). A coating film may be formed by a method using the coating composition of the present invention, the method comprising, for example, optionally forming a primer coating film on a metal plate, and applying the coating composition of the present invention thereto.

Examples of the metal plate include cold-rolled steel plates, molten galvanized steel plates, electro-galvanized steel plates, zinc-alloy-plated steel plates (steel plates plated with zinc alloy such as iron zinc, aluminum zinc, and nickel zinc), aluminum plates, stainless-steel plates, copper plates, copper-plated steel plates, tin-plated steel plates, and the like.

When the surface of a metal plate to be coated is not contaminated with contaminants such as oil, the metal plate may be coated without any treatment. However, in order to improve adhesion between the metal plate and the coating film and to improve the corrosion resistance, it is preferable to subject the metal surface to a known metal surface treatment. Examples of such known surface treatment methods include phosphate surface treatment, chromate surface treatment, zirconium surface treatment, and the like. The primer coating composition for forming the primer coating film may be known primer coating compositions used in the fields of steel plate coating, industrial machinery coating, and metal parts coating can be used.

The primer coating composition is suitably selected according to the type of material to be coated and the type of metal surface treatment. In particular, epoxy primer coating compositions, polyester primer coating compositions, and modified primer coating compositions thereof are preferable. The primer coating composition is applied by a known coating method, such as roll-coater coating, spray coating, or dip coating, to a dry film thickness of 1 to 30 μm, and preferably 2 to 20 μm, and is usually cured by heating at an ambient temperature of 80 to 300° C. for 5 seconds to about 1 hour.

The coating composition of the present invention is applied to a metal plate mentioned above or a primer coating film. Usable coating methods include curtain coating, roll-coater coating, dip coating, spray coating, and the like. The coating composition is usually applied to a dry film thickness of 5 to 50 μm, and preferably 8 to 25 μm. The curing of a coating film formed of the coating composition of the present invention is usually performed under conditions such that the maximum temperature of the substrate is about 120 to 260° C., and preferably 150 to 230° C., for 15 seconds to 60 minutes, and preferably 3 minutes to 30 minutes.

EXAMPLES

The present invention is described below in more detail with reference to Examples and Comparative Examples. The present invention is not limited by the Examples below. Hereinafter, the "parts" and "%" are all on a mass basis.

Example 1

Production of Copolymer Resin Solution No. 1

51.7 parts of phthalic anhydride and 34.6 parts of Fluorolink E10-H (*3) were placed in a 500-ml reactor equipped with a thermometer, a stirrer, and a rectification column, and heated to 150° C. The temperature was maintained at 150° C. for 1 hour. Subsequently, 52.2 parts of isophthalic acid and 166.9 parts of Cardura E10 (*2) were added, and the mixture was heated to 160° C. with stirring. Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Further, the acid value was measured every hour, and the reaction was performed until the resin acid value was 8 mg KOH/g. The resulting product was then cooled, and the solids content was adjusted with xylene, thereby obtaining Copolymer Resin Solution No. 1, which had a solids content of 70 mass %. The resin solids content of Copolymer Resin Solution No. 1 had an acid value of 8 mg KOH/g, a hydroxy value of 13 mg KOH/g, and a weight average molecular weight of 6,500.

Example 2

Production of Copolymer Resin Solution No. 2

67.3 parts of phthalic anhydride and 45.0 parts of Fluorolink E10-H (*3) were placed in a 500-ml reactor equipped with a thermometer, a stirrer, and a rectification column, and heated to 150° C. The temperature was maintained at 150° C. for 1 hour. Subsequently, 67.9 parts of isophthalic acid, 37.2 parts of trimethylolpropane, and 94.5 parts of Denacol EX-141 (*1) were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 2, which had a solids content of 70 mass %. The resin solids content of Copolymer Resin Solution No. 2 had an acid value of 8 mg KOH/g, a hydroxy value of 68 mg KOH/g, and a weight average molecular weight of 7,000.

Examples 3 to 5

Production of Copolymer Resin No. 3 to No. 5

Copolymer Resin No. 3 to No. 5 were obtained as in Example 2, except that except that the formulations shown in Table 1 were used.

Example 6

Production of Copolymer Resin Solution No. 6

108.9 parts of phthalic anhydride and 38.3 parts of Fluorolink E10-H (*3) were placed in a 500-ml reactor equipped with a thermometer, a stirrer, and a rectification column, and heated to 150° C. The temperature was maintained at 150° C. for 1 hour. Subsequently, 28.6 parts of trimethylolethane and 128.1 parts of Cardura E10 (*2) were added, and the mixture was heated to 160° C. with stirring.

Thereafter, the temperature was increased from 160° C. to 220° C. over a period of 3 hours and maintained at 220° C.

for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 6, which had a solids content of 70 mass %. The resin solids content of Copolymer Resin Solution No. 6 had a resin acid value of 8 mg KOH/g, a hydroxy value of 58 mg KOH/g, and a weight average molecular weight of 7,000.

Example 7

Production of Copolymer Resin Solution No. 7

Copolymer Resin Solution No. 7 was obtained as in Example 6, except that the formulations shown in Table 1 were used.

Example 8

Production of Copolymer Resin Solution No. 8

31.4 parts of trimethylolpropane, 126.7 parts of Cardura E10 (*2), and 37.9 parts of Fluorolink E10-H (*3) were placed in a 500-ml reactor equipped with a thermometer, a stirrer, and a rectification column. The temperature was increased to 150° C. so that the system was uniformly stirred. Then, 120.9 parts of isophthalic acid was further added while the reaction vessel was stirred, and the temperature was increased to 160° C.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water. Thereafter, the acid value was measured every hour, and the reaction was performed until the resin acid value was 8 mg KOH/g. The resulting product was then cooled, and the solids content was adjusted with xylene, thereby obtaining Copolymer Resin Solution No. 8, which had a solids content of 70 mass %.

The resin solids content of Copolymer Resin Solution No. 8 had a hydroxy value of 57 mg KOH/g, and a weight average molecular weight of 6,500.

Examples 9 and 10

Production of Copolymer Resin Solution No. 9 and No. 10

Copolymer Resin Solution No. 9 and No. 10 were obtained as in Example 6, except that the formulations shown in Table 1 were used.

TABLE 1

| | | | Ex. 1 | Ex. 2 | Ex. 3 | Ex. 4 | Ex. 5 |
|---|---|---|---|---|---|---|---|
| | Copolymer resin solution | | No. 1 | No. 2 | No. 3 | No. 4 | No. 5 |
| Formulation | Polybasic acid component (a1) | Phthalic anhydride | 51.7 | 67.3 | 77.8 | 58.6 | 56.7 |
| | | Hexahydrophthalic anhydride | | | | | |
| | | Isophthalic acid | 52.2 | 67.9 | 78.6 | 59.2 | 57.3 |
| | Compound (a22), which generates one or more secondary hydroxyl groups by reaction with one or more carboxyl groups | Denacol EX-141 (*1) | | 94.5 | 113.4 | 88.5 | |
| | | Cardura E10 (*2) | 166.9 | | | | 126.7 |
| | Primary-hydroxy-containing polyhydric alcohol component (a23) | Trimethylolpropane | | 37.2 | 43.1 | | 31.4 |
| | | Trimethylolethane | | | | | |
| | | Pentaerythritol | | | | 25 | |
| | | Neopentyl glycol | | | | | |
| | Fluorine-containing diol (f) | Fluorolink E10-H (*3) | 34.6 | 45.0 | | 78.4 | 37.9 |
| | | Fluorolink D10-H (*4) | | | 0.35 | | |
| Resin characteristics | Content (%) of fluorine-containing diol (f) in copolymer resin | | 11.5 | 15.0 | 0.1 | 26.0 | 12.6 |
| | Acid value (mg KOH/g) | | 8 | 8 | 8 | 8 | 8 |
| | Hydroxy value (mg KOH/g) | | 13 | 68 | 79 | 82 | 57 |
| | Weight average molecular weight | | 6500 | 7000 | 7000 | 6500 | 6500 |
| | Transparency (*5) | | S | S | S | A | S |

| | | | Ex. 6 | Ex. 7 | Ex. 8 | Ex. 9 | Ex. 10 |
|---|---|---|---|---|---|---|---|
| | Copolymer resin solution | | No. 6 | No. 7 | No. 8 | No. 9 | No. 10 |
| Formulation | Polybasic acid component (a1) | Phthalic anhydride | 108.9 | | | 132.5 | 138.3 |
| | | Hexahydrophthalic anhydride | | 110.5 | | | |
| | | Isophthalic acid | | | 120.9 | | |
| | Compound (a22), which generates one or more secondary hydroxyl groups by reaction with one or more carboxyl groups | Denacol EX-141 (*1) | | | | 72.6 | 45.5 |
| | | Cardura E10 (*2) | 128.1 | 124.9 | 126.7 | | |
| | Primary-hydroxy-containing polyhydric alcohol component (a23) | Trimethylolpropane | | 30.9 | 31.4 | 38.6 | 40.3 |
| | | Trimethylolethane | 28.6 | | | | |
| | | Pentaerythritol | | | | | |
| | | Neopentyl glycol | | | | 17.3 | 38.7 |
| | Fluorine-containing diol (f) | Fluorolink E10-H (*3) | 38.3 | 37.4 | 37.9 | 46.7 | 48.7 |
| | | Fluorolink D10-H (*4) | | | | | |
| Resin characteristics | Content (%) of fluorine-containing diol (f) in copolymer resin | | 12.6 | 12.5 | 12.6 | 15.6 | 15.6 |
| | Acid value (mg KOH/g) | | 8 | 8 | 8 | 10 | 8 |
| | Hydroxy value (mg KOH/g) | | 58 | 57 | 57 | 71 | 74 |
| | Weight average molecular weight | | 7000 | 6500 | 6500 | 8500 | 8000 |
| | Transparency (*5) | | S | S | S | S | S |

(*1) Denacol EX-141: trade name of Nagase ChemteX Corporation; epoxy equivalent 154, a compound (a22), which generates one or more secondary hydroxyl groups by reaction with one or more carboxyl groups.

(*2) Cardura E10: trade name of HEXION Specialty Chemicals; glycidyl ester of a synthetic hyperbranched saturated fatty acid, a compound (a22), which generates one or more secondary hydroxyl groups by reaction with one or more carboxyl groups.

(*3) Fluorolink E10-H: trade name of Solvay; a fluorine-containing diol (f) having hydroxyl groups at both ends and being represented by Formula (1), wherein a=1 to 20, and b=1 to 20.

(*4) Fluorolink D10-H: trade name of Solvay; a fluorine-containing diol (f) having hydroxyl groups at both ends and being represented by Formula (1), wherein a=0, and b=0.

(*5) Transparency: Each copolymer resin was placed in a test tube (20-cm height, 20-mL volume) and allowed to stand at 30° C. for 7 days. The state of copolymer resins was observed and evaluated according to the following:

S: Transparent with no cloudiness
A: Slight cloudiness, but acceptable
B: Clearly observed cloudiness
C: Significant cloudiness Example 11

Production of Copolymer Resin Solution No. 11

38.8 parts of trimethylolpropane, 97.2 parts of 2,2,4-trimethyl-1,3-pentanediol, and 46.9 parts of Fluorolink E10-H (*3) were placed in a 500-ml reactor equipped with a thermometer, a stirrer, and a rectification column. The temperature was increased to 150° C. so that the system was uniformly stirred. Then, 149.5 parts of isophthalic acid was further added while the reaction vessel was stirred, and the temperature was increased to 160° C. Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Thereafter, the acid value was measured every hour, and the reaction was performed until the resin acid value was 7 mg KOH/g. The resulting product was then cooled, and the solids content was adjusted with xylene, thereby obtaining Copolymer Resin Solution No. 11, which had a solids content of 70 mass %. The resin solids content of Copolymer Resin Solution No. 11 had an acid value of 7 mg KOH/g, a hydroxy value of 81 mg KOH/g, and a weight average molecular weight of 6,500.

Example 12

Production of Copolymer Resin Solution No. 12

101.8 parts of phthalic anhydride and 0.5 parts of Fluorolink E10-H (*3) were placed in a 500-ml reactor equipped with a thermometer, a stirrer, and a rectification column, and heated to 150° C. The temperature was maintained at 150° C. for 1 hour. Next, 102.8 parts of isophthalic acid, 56.4 parts of trimethylolpropane, and 73.2 parts of 1,2-propanediol were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 12, which had a solids content of 70 mass %. The resin solids content of Copolymer Resin Solution No. 12 had an acid value of 8 mg KOH/g, a hydroxy value of 111 mg KOH/g, and a weight average molecular weight of 7,000.

Example 13

Production of Copolymer Resin Solution No. 13

Copolymer Resin No. 13 was obtained as in Example 12, except that the formulations shown in Table 2 were used.

Example 14

Production of Copolymer Resin Solution No. 14

63.6 parts of phthalic anhydride and 85.1 parts of Fluorolink E10-H (*3) were placed in a 500-ml reactor equipped with a thermometer, a stirrer, and a rectification column, and heated to 150° C. The temperature was maintained at 150° C. for 1 hour. Next, 64.2 parts of isophthalic acid, 85.0 parts of 2,2,4-trimethyl-1,3-pentanediol, and 23.7 parts of glycerin were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 14, which had a solids content of 70 mass %. The resin solids content of Copolymer Resin Solution No. 14 had an acid value of 8 mg KOH/g, a hydroxy value of 72 mg KOH/g, and a weight average molecular weight of 6,500.

Example 15

Copolymer Resin No. 15 was obtained as in Example 12, except that the formulations shown in Table 2 were used.

Example 16

Production of Copolymer Resin Solution No. 16

136.2 parts of hexahydrophthalic anhydride and 46.1 parts of Fluorolink E10-H (*3) were placed in a 500-ml reactor equipped with a thermometer, a stirrer, and a rectification column, and heated to 150° C. The temperature was maintained at 150° C. for 1 hour. Next, 95.5 parts of 2,2,4-trimethyl-1,3-pentanediol and 38.1 parts of trimethylolpropane were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 16, which had a solids content of 70 mass %. The resin solids content of the Copolymer Resin Solution No. 16 had a resin acid value of 10 mg KOH/g, a hydroxy value of 80 mg KOH/g, and a weight average molecular weight of 6,500.

Example 17

Production of Copolymer Resin Solution No. 17

63.0 parts of phthalic anhydride and 42.1 parts of Fluorolink E10-H (*3) were placed in a 500-ml reactor equipped with a thermometer, a stirrer, and a rectification column, and heated to 150° C. The temperature was maintained at 150° C. for 1 hour. Next, 63.6 parts of isophthalic acid, 64.8 parts of trimethylolpropane, 45.3 parts of 2,2,4-trimethyl-1,3-pentanediol, and 67.7 parts of Cardura E10 (*2) were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water. Furthermore, the acid value was measured every hour, and the reaction was performed until the resin acid value was 7 mg KOH/g. The resulting product was then cooled, and the solids content was adjusted with xylene, thereby obtaining Copolymer Resin Solution No. 17, which had a solids content of 70 mass %.

The resin solids content of Copolymer Resin Solution No. 17 had an acid value of 7 mg KOH/g, a hydroxy value of 71 mg KOH/g, and a weight average molecular weight of 7,300.

Example 18

Production of Copolymer Resin Solution No. 18

Copolymer Resin Solution No. 18 was obtained as in Example 17, except that the formulation shown in Table 2 was used.

Example 19

Production of Copolymer Resin Solution No. 19

129.2 parts of phthalic anhydride and 45.5 parts of Fluorolink E10-H (*3) were placed in a 500-ml reactor equipped with a thermometer, a stirrer, and a rectification column, and heated to 150° C. The temperature was maintained at 150° C. for 1 hour. Next, 24.4 parts of 2,2,4-trimethyl-1,3-pentanediol, 70.7 parts of Denacol EX-141 (*1), and 37.6 parts of trimethylolpropane were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 19, which had a solids content of 70 mass %. The resin solids content of Copolymer Resin Solution No. 19 had a resin acid value of 11 mg KOH/g, a hydroxy value of 80 mg KOH/g, and a weight average molecular weight of 6,000.

TABLE 2

| | | | Ex. 11 | Ex. 12 | Ex. 13 | Ex. 14 | Ex. 15 |
|---|---|---|---|---|---|---|---|
| | Copolymer resin solution | | No. 11 | No. 12 | No. 13 | No. 14 | No. 15 |
| Formulation | Polybasic acid component (a1) | Phthalic anhydride | | 101.8 | 70.1 | 63.6 | 72.0 |
| | | Hexahydrophthalic anhydride | | | | | |
| | | Isophthalic acid | 149.5 | 102.8 | 70.8 | 64.2 | 72.7 |
| | Secondary-hydroxyl-group-containing polyhydric alcohol component (a21) | 2,2,4-Trimethyl-1,3-pentanediol | 97.2 | | 97.2 | 85.0 | 74.0 |
| | | 1,2-Propanediol | | 73.2 | | | |
| | | Glycerin | | | | | |
| | Compound (a22), which generates one or more secondary hydroxyl groups by reaction with one or more carboxyl groups | Denacol EX-141 (*1) | | | | | |
| | | Cardura E10 (*2) | | | | | |
| | Primary-hydroxy-containing polyhydric alcohol component (a23) | Trimethylolpropane | 38.8 | 56.4 | 38.8 | | 39.8 |
| | | Neopentyl glycol | | | | 23.7 | 17.9 |
| | Fluorine-containing diol (f) | Fluorolink E10-H (*3) | 46.9 | 0.54 | 46.9 | 85.1 | 48.2 |
| | | Fluorolink D10-H (*4) | | | | | |
| Resin characteristics | Content (%) of fluorine-containing diol (f) in copolymer resin | | 15.6 | 0.2 | 15.6 | 28.4 | 16.1 |
| | Acid value (mg KOH/g) | | 7 | 8 | 8 | 8 | 8 |
| | Hydroxy value (mg KOH/g) | | 81 | 111 | 79 | 72 | 81 |
| | Weight average molecular weight | | 6500 | 7000 | 7000 | 6500 | 7000 |
| | Transparency (*5) | | A | S | S | S | S |

| | | | Ex. 16 | Ex. 17 | Ex. 18 | Ex. 19 |
|---|---|---|---|---|---|---|
| | Copolymer resin solution | | No. 16 | No. 17 | No. 18 | No. 19 |
| Formulation | Polybasic acid component (a1) | Phthalic anhydride | | 63.0 | 64.4 | 129.2 |
| | | Hexahydrophthalic anhydride | 136.2 | | | |
| | | Isophthalic acid | | 63.6 | 65.0 | |
| | Secondary-hydroxyl-group-containing polyhydric alcohol component (a21) | 2,2,4-Trimethyl-1,3-pentanediol | 95.5 | 45.3 | 46.3 | 24.4 |
| | | 1,2-Propanediol | | | | |
| | | Glycerin | | | | |

TABLE 2-continued

| | | | | | | |
|---|---|---|---|---|---|---|
| | Compound (a22), which generates one or more secondary hydroxyl groups by reaction with one or more carboxyl groups | Denacol EX-141 (*1) Cardura E10 (*2) | | 67.7 | 69.3 | 70.7 |
| | Primary-hydroxy-containing polyhydric alcohol component (a23) | Trimethylolpropane Neopentyl glycol | 38.1 | 64.8 | 36.7 | 37.6 |
| | Fluorine-containing diol (f) | Fluorolink E10-H (*3) Fluorolink D10-H (*4) | 46.1 | 42.1 | 36.1 | 45.5 |
| Resin characteristics | Content (%) of fluorine-containing diol (f) in copolymer resin | | 15.4 | 14.0 | 12.0 | 15.2 |
| | Acid value (mg KOH/g) | | 10 | 7 | 10 | 11 |
| | Hydroxy value (mg KOH/g) | | 80 | 71 | 75 | 80 |
| | Weight average molecular weight | | 6500 | 7300 | 8500 | 6000 |
| | Transparency (*5) | | S | S | S | S |

Comparative Example 1

Production of Copolymer Resin Solution No. 20

43.1 parts of trimethylolpropane, 77.9 parts of phthalic anhydride, and 113.5 parts of Denacol EX-141 (*1) were placed in a 500-ml reactor equipped with a thermometer, a stirrer, and a rectification column. The temperature was then increased to 150° C. so that the system was uniformly stirred. While the reaction vessel was stirred, 78.7 parts of isophthalic acid was further added, and the temperature was increased to 160° C.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 20, which had a solids content of 70 mass %. The resin solids content of Copolymer Resin Solution No. 20 had a hydroxy value of 79 mg KOH/g, and a weight average molecular weight of 7,000.

Comparative Example 2

Production of Copolymer Resin Solution No. 21

47.7 parts of phthalic anhydride and 127.6 parts of Fluorolink E10-H (*3) were placed in a 500-ml reactor equipped with a thermometer, a stirrer, and a rectification column, and heated to 150° C. The temperature was maintained at 150° C. for 1 hour. Next, 48.1 parts of isophthalic acid, 59.5 parts of Denacol EX-141 (*1), and 23.4 parts of trimethylolpropane were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 21, which had a solids content of 70 mass %. The resin solids content of Copolymer Resin Solution No. 21 had an acid value of 7 mg KOH/g, a hydroxy value of 98 mg KOH/g, and a weight average molecular weight of 8,500.

Comparative Example 3

Production Example of Copolymer Resin Solution No. 22

Copolymer Resin Solution No. 22 was obtained as in Comparative Example 2, except that the formulation shown in Table 3 was used.

Comparative Example 4

Production Example of Copolymer Resin Solution No. 23

Copolymer Resin Solution No. 23 was obtained as in Comparative Example 1, except that the formulation shown in Table 3 was used.

Comparative Example 5

Production Example of Copolymer Resin Solution No. 24

Copolymer Resin Solution No. 24 was obtained as in Comparative Example 2, except that the formulation shown in Table 3 was used.

Comparative Example 6

Production of Copolymer Resin Solution No. 25

77.7 parts of phthalic anhydride and 52.1 parts of Fluorolink E10-H (*3) were placed in a 500-ml reactor equipped with a thermometer, a stirrer, and a rectification column, and heated to 150° C. The temperature was maintained at 150° C. for 1 hour. Next, 78.7 parts of isophthalic acid, 43.1 parts of trimethylolpropane, and 74.7 parts of neopentyl glycol were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 25, which had a solids content of 70 mass %. The resin solids content of Copolymer Resin Solution No. 25 had an acid value of 10 mg KOH/g, a hydroxy value of 86.8 mg KOH/g, and a weight average molecular weight of 7,500.

Comparative Example 7

Production of Copolymer Resin Solution No. 26

78.5 parts of phthalic anhydride and 45.0 parts of hexafluoro-1,5-pentanediol were placed in a 500-ml reactor equipped with a thermometer, a stirrer, and a rectification column, and heated to 150° C. The temperature was maintained at 150° C. for 1 hour. Next, 79.2 parts of isophthalic acid, 80.6 parts of 2,2,4-trimethyl-1,3-pentanediol, and 43.4 parts of trimethylolpropane were added, and the mixture was heated to 160° C. with stirring.

Thereafter, the temperature was increased from 160° C. to 220° C. over a period of 3 hours and maintained at 220° C. for 2 hours. Then, the rectification column was replaced with a water separator, and a polycondensation reaction was performed while xylene was added to the reactor and water separator to azeotrope water and remove condensed water.

Furthermore, the acid value was measured every hour, and the reaction was performed until the resin acid value was 8 mg KOH/g. The resulting product was then cooled, and the solids content was adjusted with xylene, thereby obtaining Copolymer Resin Solution No. 26, which had a solids content of 70 mass %. The resin solids content of Copolymer Resin Solution No. 26 had an acid value of 8 mg KOH/g, a hydroxy value of 87.3 mg KOH/g, and a weight average molecular weight of 7,000.

replaced with a water separator. 124 parts of xylene was added to the mixture, and xylene was also added to the water separator to azeotrope water and xylene, and remove condensed water. The resulting mixture was allowed to react until an acid value of 10 mg KOH/g was achieved. Then, the mixture was cooled, and 855 parts of cyclohexanone was added to the reaction product, thereby giving a polyester resin solution having a solids content of 55%. The obtained resin had a hydroxy value of 184 mg KOH/g and a number average molecular weight of 3,600.

Production Example 2

Production Example of Acrylic Resin Solution 480 parts of butyl acetate was placed in a reaction vessel equipped with a thermometer, a thermostat, a stirrer, a reflux condenser, and a dropping funnel. While blowing nitrogen gas, the mixture was heated to 130° C. Then, while the temperature was maintained, a mixed solution of 200 parts of styrene, 290 parts of methyl methacrylate, 250 parts of cyclohexyl methacrylate, 260 parts of 2-hydroxyethyl methacrylate, and 50 parts of 2,2'-azobis(2-methylbutyronitrile) was added dropwise from the dropping funnel over 3 hours.

After the dropwise addition, the reaction product was aged at 130° C. for 1 hour, and the solids content was adjusted with cyclohexanone to give an acrylic resin solu-

TABLE 3

| Formulation | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| | Copolymer resin solution | | No. 20 | No. 21 | No. 22 | No. 23 | No. 24 | No. 25 | No. 26 |
| Formulation | Polybasic acid component (a1) | Phthalic anhydride | 77.9 | 47.7 | 74.9 | 82.0 | 51.0 | 77.7 | 78.5 |
| | | Hexahydrophthalic anhydride | | | | | | | |
| | | Isophthalic acid | 78.7 | 48.1 | 75.6 | 82.7 | 51.5 | 78.7 | 79.2 |
| | Secondary-hydroxyl-group-containing polyhydric alcohol component (a21) | 2,2,4-Trimethyl-1,3-pentanediol | | | | | 117.9 | 63.9 | 80.6 |
| | | 1,2-Propanediol | | | | | | | |
| | | Glycerin | | | | | | | |
| | Compound (a22), which generates one or more secondary hydroxyl groups by reaction with one or more carboxyl groups | Denacol EX-141 (*1) | 113.5 | 59.5 | 89.7 | | | | |
| | | Cardura E10 (*2) | | | | | | | |
| | Primary-hydroxy-containing polyhydric alcohol component (a23) | Trimethylolpropane | 43.1 | 23.4 | | 45.4 | 28.2 | 43.1 | 43.4 |
| | | Trimethylolethane | | | | | | | |
| | | Pentaerythritol | | | 31.9 | | | | |
| | | Neopentyl glycol | | | | | | 74.7 | |
| | Fluorine-containing diol (f) | Fluorolink E10-H (*3) | | 127.6 | | | 122.8 | 52.1 | |
| | | Fluorolink D10-H (*4) | | | | | | | |
| | | Hexafluoro-1,5-pentanediol | | | 43.0 | | | | 45.0 |
| Resin characteristics | Content (%) of fluorine-containing diol (f) in copolymer resin | | 0 | 45.5 | 14.3 | 0 | 40.9 | 17.4 | 15.0 |
| | Acid value (mg KOH/g) | | 8 | 7 | 7 | 8 | 7 | 10 | 8 |
| | Hydroxy value (mg KOH/g) | | 79 | 98 | 104 | 90.9 | 59.5 | 86.8 | 87.3 |
| | Weight average molecular weight | | 7000 | 8500 | 8500 | 7000 | 8500 | 7500 | 7000 |
| | Transparency (*5) | | S | B | B | S | B | B | A |

Production of Hydroxy-Containing Resin (B)

Production Example 1

Production Example of Polyester Resin Solution 1079 parts of isophthalic acid, 407 parts of adipic acid, 466 parts of neopentyl glycol, and 802 parts of trimethylolpropane were placed in a reactor equipped with a thermometer, a stirrer, a heater, and a rectification column, and heated to 160° C. The temperature was further increased gradually from 160 to 230° C. over a period of 3 hours.

Subsequently, after the reaction was allowed to proceed at 230° C. for 30 minutes, the rectification column was tion having a resin solids content of 55%. The obtained resin had a hydroxy value of 107 mg KOH/g and a number average molecular weight of 7,500.

Production Of Coating Composition

Example 20

Production of Coating Composition No. 1

A mixture of 3 parts (solids content) of Copolymer Resin No. 1 obtained in Example 1, 80 parts (solids content) of the polyester resin solution obtained in Production Example 1, 20 parts (solids content) of Cymel 303 (*6), 120 parts of Tipaque CR-95 (*8), and 0.5 part of dodecylbenzenesulfonic acid was diluted by addition of an organic solvent (a mixed solvent of cyclohexanone/Swasol 1500=40/60 (by mass)), thereby obtaining Coating Composition No. 1, which had a viscosity of 80 seconds (Ford Cup No. 4, 25° C.).

Examples 21 to 46

Production Examples of Coating Composition No. 2 to No. 27

Coating Composition No. 2 to No. 27 were obtained in the same manner as in Example 20, except that the formulations shown in Tables 4 and 5 were used. The tables also show the results evaluated by the following performance tests.

Comparative Examples 8 to 17

Production Examples of Coating Composition No. 28 to No. 37

Coating Composition No. 28 to No. 37 were obtained in the same manner as in Example 20, except that the formulations shown in Table 6 were used. The table also shows the results evaluated by the following performance tests.

TABLE 4

| | | | | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|
| | | Coating composition | | No. 1 | No. 2 | No. 3 | No. 4 | No. 5 | No. 6 | No. 7 | No. 8 | No. 9 |
| Formulation | Component A | Copolymer Resin No. 1 | | 3 | | | | | | | | |
| | | Copolymer Resin No. 2 | | | 3 | | | | | | | |
| | | Copolymer Resin No. 3 | | | | 3 | | | | | | |
| | | Copolymer Resin No. 4 | | | | | 3 | | | | | |
| | | Copolymer Resin No. 5 | | | | | | 3 | | | | |
| | | Copolymer Resin No. 6 | | | | | | | 3 | | | |
| | | Copolymer Resin No. 7 | | | | | | | | 3 | | |
| | | Copolymer Resin No. 8 | | | | | | | | | 3 | |
| | | Copolymer Resin No. 9 | | | | | | | | | | 3 |
| | | Copolymer Resin No. 10 | | | | | | | | | | |
| | Component B | Polyester resin solution obtained in Production Example 1 | | 80 | 80 | 80 | 80 | 80 | 80 | 80 | 80 | 80 |
| | | Acrylic resin solution obtained in Production Example 2 | | | | | | | | | | |
| | Component C | Cymel 303 | (*6) | 20 | 20 | 20 | 20 | 20 | 20 | 20 | 20 | 20 |
| | | Blocked polyisocyanate compound A | (*7) | | | | | | | | | |
| | Other component | Tipaque CR-95 | (*8) | 120 | 120 | 120 | 120 | 120 | 120 | 120 | 120 | 120 |
| | | Dodecylbenzenesulfonic acid | | 0.5 | 0.5 | 0.5 | 0.5 | 0.5 | 0.5 | 0.5 | 0.5 | 0.5 |
| | | Dibutyltin laurate | | | | | | | | | | |
| Test results | | Storage stability | (*9) | A | A | S | A | A | S | S | A | S |
| | | Water and oil repellency (*10) | Water repellency | A | S | A | S | S | S | S | S | S |
| | | | Oil repellency | A | S | A | S | S | S | S | S | S |
| | | Chemical resistance | (*10) | A | S | S | A | S | S | S | S | S |
| | | Processability | (*11) | A | S | S | A | S | A | A | S | A |

| | | | | Ex. 29 | Ex. 30 | Ex. 31 | Ex. 32 | Ex. 33 |
|---|---|---|---|---|---|---|---|---|
| | | Coating composition | | No. 10 | No. 11 | No. 12 | No. 13 | No. 14 |
| Formulation | Component A | Copolymer Resin No. 1 | | | | | | |
| | | Copolymer Resin No. 2 | | | 3 | | 1 | 10 |
| | | Copolymer Resin No. 3 | | | | | | |
| | | Copolymer Resin No. 4 | | | | | | |
| | | Copolymer Resin No. 5 | | | | | | |
| | | Copolymer Resin No. 6 | | | | | | |
| | | Copolymer Resin No. 7 | | | | 3 | | |
| | | Copolymer Resin No. 8 | | | | | | |
| | | Copolymer Resin No. 9 | | | | | | |
| | | Copolymer Resin No. 10 | | 3 | | | | |
| | Component B | Polyester resin solution obtained in Production Example 1 | | 80 | | 80 | 80 | 80 |
| | | Acrylic resin solution obtained in Production Example 2 | | | 80 | | | |
| | Component C | Cymel 303 | (*6) | 20 | 20 | | 20 | 20 |
| | | Blocked polyisocyanate compound A | (*7) | | | 20 | | |
| | Other component | Tipaque CR-95 | (*8) | 120 | 120 | 120 | 120 | 120 |
| | | Dodecylbenzenesulfonic acid | | 0.5 | 0.5 | | 0.5 | 0.5 |
| | | Dibutyltin laurate | | | | 0.5 | | |
| Test results | | Storage stability | (*9) | A | A | S | S | A |
| | | Water and oil repellency (*10) | Water repellency | S | S | S | A | S |
| | | | Oil repellency | S | S | S | A | S |
| | | Chemical resistance | (*10) | S | S | S | S | S |
| | | Processability | (*11) | A | S | A | S | A |

TABLE 5

|  |  |  |  | Ex. 34 | Ex. 35 | Ex. 36 | Ex. 37 | Ex. 38 | Ex. 39 | Ex. 40 |
|---|---|---|---|---|---|---|---|---|---|---|
|  | Coating composition |  |  | No. 15 | No. 16 | No. 17 | No. 18 | No. 19 | No. 20 | No. 21 |
| Formulation | Component A | Copolymer Resin No. 11 |  | 3 |  |  |  |  |  |  |
|  |  | Copolymer Resin No. 12 |  |  | 3 |  |  |  |  |  |
|  |  | Copolymer Resin No. 13 |  |  |  | 3 |  |  |  |  |
|  |  | Copolymer Resin No. 14 |  |  |  |  | 3 |  |  |  |
|  |  | Copolymer Resin No. 15 |  |  |  |  |  | 3 |  |  |
|  |  | Copolymer Resin No. 16 |  |  |  |  |  |  | 3 |  |
|  |  | Copolymer Resin No. 17 |  |  |  |  |  |  |  | 3 |
|  |  | Copolymer Resin No. 18 |  |  |  |  |  |  |  |  |
|  |  | Copolymer Resin No. 19 |  |  |  |  |  |  |  |  |
|  | Component B | Polyester resin solution obtained in Production Example 1 |  | 80 | 80 | 80 | 80 | 80 | 80 | 80 |
|  |  | Acrylic resin solution obtained in Production Example 2 |  |  |  |  |  |  |  |  |
|  | Component C | Cymel 303 | (*6) | 20 | 20 | 20 | 20 | 20 | 20 | 20 |
|  |  | Blocked polyisocyanate compound A | (*7) |  |  |  |  |  |  |  |
|  | Other component | Tipaque CR-95 | (*8) | 120 | 120 | 120 | 120 | 120 | 120 | 120 |
|  |  | Dodecylbenzenesulfonic acid |  | 0.5 | 0.5 | 0.5 | 0.5 | 0.5 | 0.5 | 0.5 |
|  |  | Dibutyltin laurate |  |  |  |  |  |  |  |  |
| Test results | Storage stability | (*9) |  | A | S | A | A | A | A | S |
|  | Water and oil repellency (*10) | Water repellency |  | A | A | S | S | S | A | S |
|  |  | Oil repellency |  | A | A | S | S | S | A | S |
|  | Chemical resistance | (*11) |  | A | S | S | A | S | S | S |
|  | Processability | (*12) |  | A | S | S | A | S | S | S |

|  |  |  |  | Ex. 41 | Ex. 42 | Ex. 43 | Ex. 44 | Ex. 45 | Ex. 46 |
|---|---|---|---|---|---|---|---|---|---|
|  | Coating composition |  |  | No. 22 | No. 23 | No. 24 | No. 25 | No. 26 | No. 27 |
| Formulation | Component A | Copolymer Resin No. 11 |  |  |  |  |  |  |  |
|  |  | Copolymer Resin No. 12 |  |  |  |  |  |  |  |
|  |  | Copolymer Resin No. 13 |  |  |  | 3 |  | 1 | 10 |
|  |  | Copolymer Resin No. 14 |  |  |  |  |  |  |  |
|  |  | Copolymer Resin No. 15 |  |  |  |  |  |  |  |
|  |  | Copolymer Resin No. 16 |  |  |  |  |  |  |  |
|  |  | Copolymer Resin No. 17 |  |  |  |  | 3 |  |  |
|  |  | Copolymer Resin No. 18 |  | 3 |  |  |  |  |  |
|  |  | Copolymer Resin No. 19 |  |  | 3 |  |  |  |  |
|  | Component B | Polyester resin solution obtained in Production Example 1 |  | 80 | 80 |  | 80 | 80 | 80 |
|  |  | Acrylic resin solution obtained in Production Example 2 |  |  |  | 80 |  |  |  |
|  | Component C | Cymel 303 | (*6) | 20 | 20 | 20 |  | 20 | 20 |
|  |  | Blocked polyisocyanate compound A | (*7) |  |  |  | 20 |  |  |
|  | Other component | Tipaque CR-95 | (*8) | 120 | 120 | 120 | 120 | 120 | 120 |
|  |  | Dodecylbenzenesulfonic acid |  | 0.5 | 0.5 | 0.5 |  | 0.5 | 0.5 |
|  |  | Dibutyltin laurate |  |  |  |  | 0.5 |  |  |
| Test results | Storage stability | (*9) |  | S | S | A | S | S | A |
|  | Water and oil repellency (*10) | Water repellency |  | A | S | S | S | A | S |
|  |  | Oil repellency |  | A | S | S | S | A | S |
|  | Chemical resistance | (*11) |  | S | S | S | S | S | S |
|  | Processability | (*12) |  | S | S | S | S | S | A |

TABLE 6

|  |  |  | Comp. Ex. 8 | Comp. Ex. 9 | Comp. Ex. 10 | Comp. Ex. 11 | Comp. Ex. 12 |
|---|---|---|---|---|---|---|---|
|  | Coating composition |  | No. 28 | No. 29 | No. 30 | No. 31 | No. 32 |
| Formulation | Component A | Copolymer Resin No. 2 |  |  |  |  |  |
|  |  | Copolymer Resin No. 20 | 3 |  |  |  |  |
|  |  | Copolymer Resin No. 21 |  | 3 |  |  |  |
|  |  | Copolymer Resin No. 22 |  |  | 3 |  |  |
|  |  | Copolymer Resin No. 23 |  |  |  | 3 |  |
|  |  | Copolymer Resin No. 24 |  |  |  |  | 3 |
|  |  | Copolymer Resin No. 25 |  |  |  |  |  |
|  |  | Copolymer Resin No. 26 |  |  |  |  |  |

TABLE 6-continued

|  |  |  |  |  |  |  |  |  |
|---|---|---|---|---|---|---|---|---|
| Component B | Polyester resin solution obtained in Production Example 1 |  | 80 | 80 | 80 | 80 | 80 |  |
|  | Acrylic resin solution obtained in Production Example 2 |  |  |  |  |  |  |  |
| Component C | Cymel 303 | (*6) | 20 | 20 | 20 | 20 | 20 |  |
|  | Blocked polyisocyanate compound A | (*7) |  |  |  |  |  |  |
| Other component | Tipaque CR-95 | (*8) | 120 | 120 | 120 | 120 | 120 |  |
|  | Dodecylbenzenesulfonic acid |  | 0.5 | 0.5 | 0.5 | 0.5 | 0.5 |  |
|  | Dibutyltin laurate |  |  |  |  |  |  |  |
| Test results | Storage stability | (*9) | S | B | B | S | B |  |
|  | Water and oil repellency | Water repellency | C | S | B | C | S |  |
|  | (*10) | Oil repellency | C | S | B | C | S |  |
|  | Chemical resistance | (*11) | A | B | B | A | B |  |
|  | Processability | (*12) | S | B | B | S | B |  |

|  |  |  | Comp. Ex. 13 | Comp. Ex. 14 | Comp. Ex. 15 | Comp. Ex. 16 | Comp. Ex. 17 |
|---|---|---|---|---|---|---|---|
|  | Coating composition |  | No. 33 | No. 34 | No. 35 | No. 36 | No. 37 |
| Formulation | Component A | Copolymer Resin No. 2 |  |  |  |  |  |
|  |  | Copolymer Resin No. 20 |  |  |  |  |  |
|  |  | Copolymer Resin No. 21 |  |  |  |  |  |
|  |  | Copolymer Resin No. 22 |  |  |  |  |  |
|  |  | Copolymer Resin No. 23 |  |  |  |  |  |
|  |  | Copolymer Resin No. 24 |  |  |  |  |  |
|  |  | Copolymer Resin No. 25 | 3 |  |  |  |  |
|  |  | Copolymer Resin No. 26 |  | 3 |  |  |  |
|  | Component B | Polyester resin solution obtained in Production Example 1 | 80 | 80 | 80 |  | 80 |
|  |  | Acrylic resin solution obtained in Production Example 2 |  |  |  | 80 |  |
|  | Component C | Cymel 303 (*6) | 20 | 20 |  | 20 | 20 |
|  |  | Blocked polyisocyanate compound A (*7) |  |  | 20 |  |  |
|  | Other component | Tipaque CR-95 (*8) | 120 | 120 | 120 | 120 | 120 |
|  |  | Dodecylbenzenesulfonic acid | 0.5 | 0.5 |  | 0.5 | 0.5 |
|  |  | Dibutyltin laurate |  |  | 0.5 |  |  |
| Test results |  | Storage stability (*9) | B | B | S | S | S |
|  |  | Water and oil repellency Water repellency | B | B | C | C | C |
|  |  | (*10) Oil repellency | B | B | C | C | C |
|  |  | Chemical resistance (*11) | B | B | A | A | A |
|  |  | Processability (*12) | B | B | S | A | S |

(*6) Cymel 303: trade name of methyl-etherified melamine resin produced by Nihon Cytec Industries Inc.

(*7) Blocked polyisocyanate compound A: an oxime blocked product of a hexamethylene diisocyanate trimer; solids content: 37 mass %; NCO content: 3.6%.

Tipaque CR-95: trade name of titanium white produced by Ishihara Sangyo Kaisha, Ltd.

(*9) Storage stability: Each coating composition is placed in a 1-L glass container, and hermetically sealed and stored in a thermostatic room at 40° C. The state after 30-day storage was evaluated according to the following criteria:

S: The coating composition did not undergo precipitation, and no change was observed, compared with the state before storage.

A: A small amount of the coating composition underwent precipitation; however, upon stirring for less than 1 minute (at 500 rpm using a stirring blade with a diameter of 3 cm), the coating composition returned to the state before storage.

B: The coating composition underwent precipitation; however, upon stirring for 1 to 60 minutes (at 500 rpm using a stirring blade with a diameter of 3 cm), the coating composition returned to the state before storage.

C: The coating composition underwent precipitation; even after stirring for 60 minutes or longer (at 500 rpm using a stirring blade with a diameter of 3 cm), aggregates remained.

Production of Test Plates

Steel plates coated with zinc-aluminum-alloy (GL material, 5 cm×10 cm×0.35 mm (plate thickness)) were spray-coated with Coating Composition No. 1 to No. 38 obtained in the Examples and Comparative Examples to a dry film thickness of 18 μm. The coating films were then baked for 10 minutes under conditions such that the maximum temperature of the substrate was 180° C. Each test plate was tested under the test conditions described below. Tables 4 to 6 below show the test results.

(*10) Water and Oil Repellency

Water Repellency

Deionized water (0.03 mL) was dropped on the coated surface of each test plate using a syringe, and the contact angle of each test plate and deionized water was measured using a CA-X150 contact angle meter produced by Kyowa Chemical Industry Co., Ltd. The water repellency was evaluated according to the following criteria:

S: The contact angle was 100 degrees or more, and the water repellency was remarkably excellent.

A: The contact angle was 90 degrees or more and less than 100 degrees, and the water repellency was excellent.

B: The contact angle was 80 degrees or more and less than 90 degrees, and the water repellency was slightly poor.

C: The contact angle was less than 80 degrees, and the water repellency was notably poor.

Oil Repellency

Oleic acid (0.03 mL) was dropped on the coated surface of each test plate using a syringe, and the contact angle of each test plate and oleic acid was measured using a CA-X150 contact angle meter produced by Kyowa Chemical Industry Co., Ltd. The oil repellency was evaluated according to the following criteria:

S: The contact angle was 70 degrees or more, and the oil repellency was remarkably excellent.
A: The contact angle was 60 degrees or more and less than 70 degrees, and the oil repellency was excellent.
B: The contact angle was 50 degrees or more and less than 60 degrees, and the oil repellency was slightly poor.
C: The contact angle was less than 50 degrees, and the oil repellency was notably poor.

(*11) Chemical Resistance: A crosscut was made in a central portion on the front surface of each test plate so that the cuts extended to the base metal. This plate was immersed in a 5% aqueous sodium hydroxide solution at 20° C. for 24 hours, withdrawn, and washed. The plate was then dried at room temperature, and evaluated for its coating film appearance on the front surface. Also, a piece of adhesive tape was adhered to the crosscut portion, and quickly peeled off. The width of peeling (on one side) from the cut portion was evaluated according to the following criteria.

S: The width of tape-induced peeling from the cut portion was 1.5 mm or less.
A: The width of tape-induced peeling from the cut portion was more than 1.5 mm and 3 mm or less.
B: The width of tape-induced peeling from the cut portion was more than 3 mm and 4 mm or less.
C: The width of tape-induced peeling from the cut portion was more than 4 mm.

(*12) Processability: Each test plate was bent 180 degrees in a manner such that the coated surface faced outside using a vice in a room at 20° C. The number of T at which no cracking occurred in the bent portion was measured according to the following criteria. The T number is defined as follows.

0T: 180-degree bending was performed with nothing inserted inside the bent portion.
1T: 180-degree bending was performed with one plate having the same thickness as the test plate being inserted inside the bent portion.
2T: 180-degree bending was performed with two plates, each having the same thickness as the test plate being inserted inside the bent portion.
4T: 180-degree bending was performed with four plates, each having the same thickness as the test plate being inserted inside the bent portion.
6T: 180-degree bending was performed with two plates, each having the same thickness as the test plate being inserted inside the bent portion.

The results were evaluated according to the following criteria.

S: No cracking occurred in 2T bending.
A: Cracking occurred in 2T bending, but no cracking was observed in 4T bending.
B: Cracking occurred in 4T bending, but no cracking was observed in 6T bending.
C: Cracking occurred in 6T bending.

INDUSTRIAL APPLICABILITY

The present invention is capable of providing a coated article having excellent water and oil repellency, chemical resistance, and processability.

The invention claimed is:

1. A copolymer resin (A) obtained by polymerization of a mixture comprising, as constituent components,
a polybasic acid component (a1);
a compound (a2) containing at least one member selected from a secondary-hydroxyl-group-containing polyhydric alcohol component (a21) and a compound (a22), which generates one or more secondary hydroxyl groups by reaction with one or more carboxyl groups; and
a fluorine-containing diol (f) having hydroxyl groups at both ends and being represented by Formula (1) below, the component (f) being used in a proportion of 0.1 to 30 mass %, based on the total mass of the constituent components:

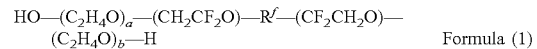

$$HO-(C_2H_4O)_a-(CH_2CF_2O)-R^f-(CF_2CH_2O)-(C_2H_4O)_b-H \quad \text{Formula (1)}$$

wherein a is an integer 0 to 20, b is an integer of 0 to 20, and $R^f$ represents Formula (2) below:

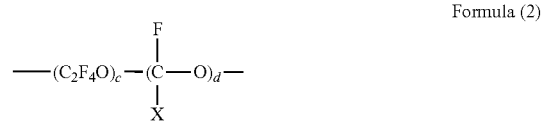

$$-(C_2F_4O)_c-\underset{\underset{X}{|}}{\overset{\overset{F}{|}}{C}}-O)_d- \quad \text{Formula (2)}$$

wherein c is an integer of 1 to 50, d is an integer of 0 to 50, and X represents a fluorine atom or $CF_3$.

2. The copolymer resin (A) according to claim 1, comprising phthalic anhydride and/or hexahydrophthalic anhydride, as the polybasic acid component (a1).

3. The copolymer resin (A) according to claim 1, comprising at least one member selected from 1,2-propanediol and 2,2,4-trimethyl-1,3-pentanediol, as the secondary-hydroxyl-group-containing polyhydric alcohol component (a21).

4. The copolymer resin (A) according to claim 1, further comprising a primary-hydroxy-containing polyhydric alcohol component (a23), as the compound (a2).

5. The copolymer resin (A) according to claim 4, wherein the primary-hydroxy-containing polyhydric alcohol component (a23) is at least one member selected from trimethylolethane, trimethylolpropane, and pentaerythritol.

6. The copolymer resin (A) according to claim 4, comprising, as the constituent components, the polybasic acid component (a1), the compound (a22), which generates one or more secondary hydroxyl groups by reaction with one or more carboxyl groups, the primary-hydroxy-containing polyhydric alcohol component (a23), and the fluorine-containing diol (f).

7. A coating composition comprising the copolymer resin (A) of claim 1.

8. The coating composition according to claim 7, further comprising a hydroxy-containing resin (B) and a crosslinking agent (C).

9. The coating composition according to claim 7, comprising the copolymer resin (A) in an amount of 0.1 to 30 parts by mass, on a solids basis, per 100 parts by mass of the total solids content of the hydroxy-containing resin (B) and the crosslinking agent (C).

10. A coated article obtained by applying the coating composition of claim 7.

* * * * *